United States Patent
Poscher et al.

(10) Patent No.: US 11,115,113 B2
(45) Date of Patent: Sep. 7, 2021

(54) TECHNIQUE FOR SELECTING A UAV APPLICATION SERVER

(71) Applicant: Telefonaktiebolaget LM Ericsson (publ), Stockholm (SE)

(72) Inventors: Jens Poscher, Aachen (DE); Ralph Detke, Herzogenrath (DE); Stefan Eichinger, Pulheim (DE); Pedro Tercero, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/632,972

(22) PCT Filed: Sep. 14, 2017

(86) PCT No.: PCT/EP2017/073142
§ 371 (c)(1),
(2) Date: Jan. 22, 2020

(87) PCT Pub. No.: WO2019/052647
PCT Pub. Date: Mar. 21, 2019

(65) Prior Publication Data
US 2020/0162149 A1    May 21, 2020

(51) Int. Cl.
*H04B 7/185*    (2006.01)
*H04W 76/12*   (2018.01)
(Continued)

(52) U.S. Cl.
CPC ....... *H04B 7/18506* (2013.01); *B64C 39/024* (2013.01); *G05D 1/0022* (2013.01);
(Continued)

(58) Field of Classification Search
CPC .. H04B 7/18506; H04W 76/12; H04W 76/11; H04W 84/042; H04W 88/16;
(Continued)

(56) References Cited

U.S. PATENT DOCUMENTS 9,537,561 B1    1/2017  Kotecha et al.
2017/0045884 A1  2/2017  Kablaoui
(Continued)

FOREIGN PATENT DOCUMENTS

WO    2016122780 A1    8/2016

OTHER PUBLICATIONS

Barton, B., "PGW and SGW Selection Procedures in LTE", LTE and Beyond, Mar. 14, 2013, pp. 1-4, retrieved on Jan. 12, 2018, retrieved from internet: http://www.lteandbeyond.com/2013/03/pgw-and-sgw-selection-procedures-in-lte.html.

*Primary Examiner* — Marisol Figueroa
(74) *Attorney, Agent, or Firm* — Coats & Bennett, PLLC

(57) ABSTRACT

A technique for selecting an unmanned aerial vehicle, UAV, application server is disclosed. A computing unit for executing a cellular network entity configured to select a UAV application server residing in a cellular network to be assigned to a UAV connecting to the cellular network comprises at least one processor and at least one memory, wherein the at least one memory contains instructions executable by the at least one processor such that the cellular network entity is operable to trigger (S204) selecting, as part of an attach procedure of the UAV to the cellular network, a UAV application server in the cellular network to be assigned to the UAV.

20 Claims, 8 Drawing Sheets

(51) Int. Cl.
*H04W 76/11* (2018.01)
*B64C 39/02* (2006.01)
*G05D 1/00* (2006.01)
*H04W 84/04* (2009.01)
*H04L 29/12* (2006.01)
*H04L 29/06* (2006.01)
*H04W 88/16* (2009.01)

(52) U.S. Cl.
CPC ...... *H04L 61/1511* (2013.01); *H04L 63/0236* (2013.01); *H04W 76/11* (2018.02); *H04W 76/12* (2018.02); *H04W 84/042* (2013.01); *H04W 88/16* (2013.01); *B64C 2201/14* (2013.01)

(58) Field of Classification Search
CPC ....... H04W 60/04; H04W 24/02; H04W 4/50; H04W 4/029; H04W 4/023; B64C 39/024; B64C 2201/14; B64C 2201/122; B64C 2201/146; G05D 1/0022; H04L 61/1511; H04L 63/0236; G06Q 10/0631
See application file for complete search history.

(56) References Cited

U.S. PATENT DOCUMENTS

| | | | | |
|---|---|---|---|---|
| 2017/0178518 A1* | 6/2017 | Foladare | ............. | G08G 5/0034 |
| 2017/0243494 A1* | 8/2017 | Taveira | ................ | G08G 5/0069 |
| 2019/0342264 A1* | 11/2019 | Sasin | ...................... | H04L 67/34 |
| 2020/0137632 A1* | 4/2020 | Hong | ................ | H04W 28/0268 |
| 2020/0296574 A1* | 9/2020 | Baek | ..................... | H04W 12/35 |

* cited by examiner

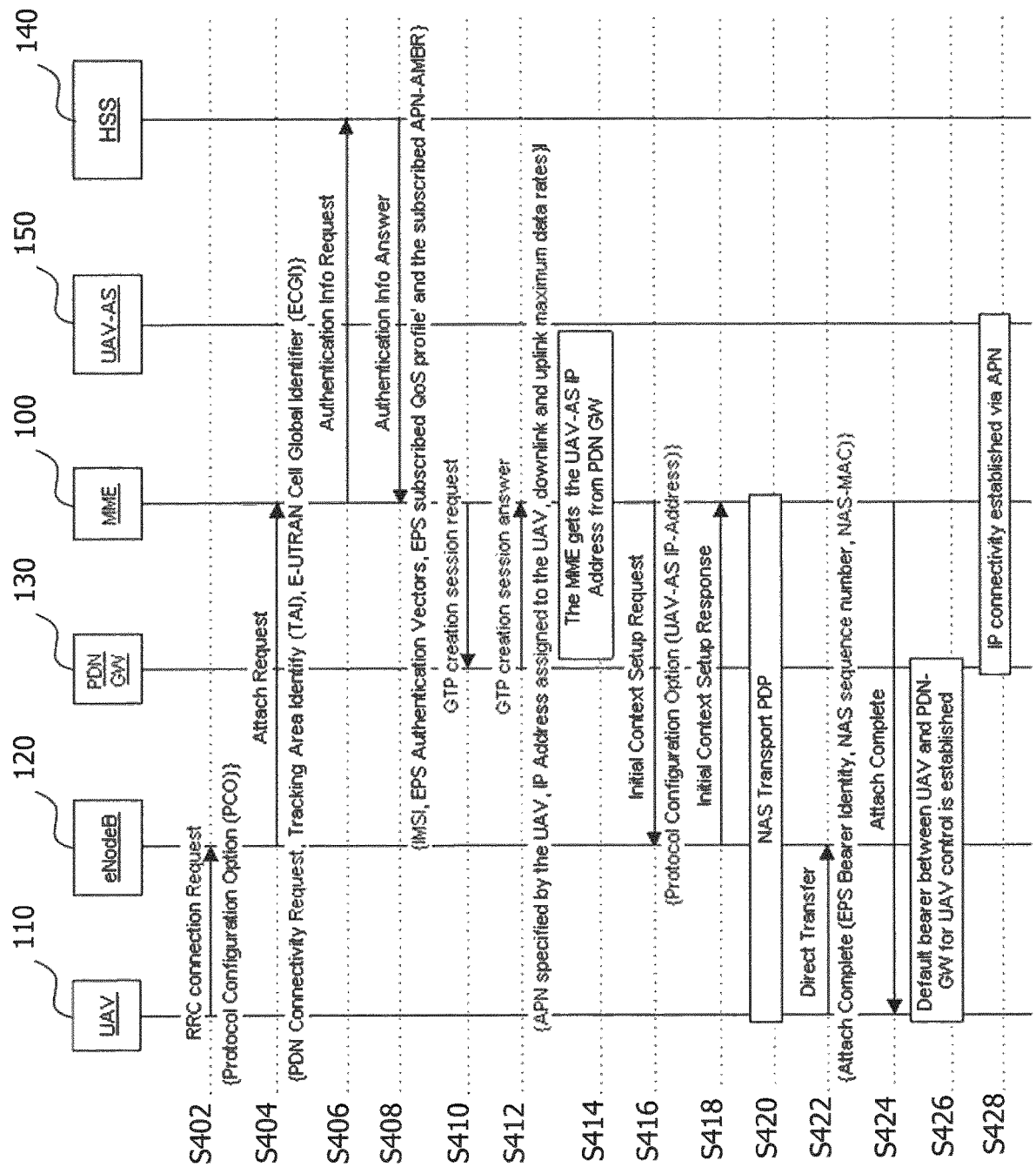

TECHNIQUE FOR SELECTING A UAV APPLICATION SERVER

TECHNICAL FIELD

The present disclosure generally relates to the field of unmanned aerial vehicles (UAVs). In particular, a technique for selecting a UAV application server to be assigned to a UAV is presented. The technique may be embodied in apparatuses, systems, methods, and computer programs.

BACKGROUND

An unmanned aerial vehicle (UAV), commonly known as a drone, is an aircraft without a human pilot aboard whose flight may either be operated under remote control by a human operator or autonomously by onboard computers. Nowadays, UAVs have been adopted for a wide variety of applications. While, originally, UAVs have mainly been used for military applications, their use has rapidly been expanded to other applications over the recent years, including applications for surveillance, peacekeeping, scientific research and commercial uses, such as in agriculture, product deliveries in logistics, aerial photography, etc.

On flight, UAVs may be connected to application servers that are part of ground based control systems via communication systems, such as cellular networks. Application servers may be run by UAV manufacturers or other authorities for the purpose of controlling and tracing the UAVs, for example. UAVs can connect to these servers via default Internet connections over-the-top (OTT) of the cellular network and, for accessing the UAV application servers, corresponding access information including required IP addresses are configured manually in the UAVs. However, each UAV manufacturer or authority typically runs its own application server and, although usage of UAVs is regulated in most countries, UAV usage cannot be generally monitored and enforced by central agencies, such as central flight regulation authorities, in order to restrict flight spaces or travel speeds and/or to manage flight paths, e.g., to provide secure travel corridors for delivery services, for example.

SUMMARY

Accordingly, there is a need for a technique which avoids the problem discussed above, or other problems.

According to a first aspect, a computing unit for executing a cellular network entity configured to select a UAV application server residing in a cellular network to be assigned to a UAV connecting to the cellular network is provided. The computing unit comprises at least one processor and at least one memory, wherein the at least one memory contains instructions executable by the at least one processor such that the cellular network entity is operable to trigger selecting, as part of an attach procedure of the UAV to the cellular network, a UAV application server in the cellular network to be assigned to the UAV.

The UAV application server may be selected from a plurality of UAV application servers in the cellular network, each covering a specific service area of the cellular network. The UAV application server may be selected from the plurality of UAV application servers in the cellular network such that a distance between the UAV and the UAV application server is minimized. The UAV application server may be selected based on UAV-related information comprising one or more parameters characterizing the UAV, wherein the one or more parameters characterizing the UAV may comprise at least one of a mobility tracking area associated with the UAV, a cell ID associated with the UAV, a type of the UAV, an owner of the UAV, a manufacturer of the UAV, and an operator of the UAV. Selecting the UAV application server may comprise determining the UAV application server by querying a domain name service (DNS) using a fully qualified domain name (FQDN) reflecting the one or more parameters characterizing the UAV.

The at least one memory may further contain instructions executable by the at least one processor such that the cellular network entity is operable to receive an attach request message originated from the UAV, wherein the attach request message includes information indicating that the UAV requests access information for accessing a UAV application server. The information indicating that the UAV requests access information for accessing a UAV application server may be included in a protocol configuration options (PCO) field of the attach request message.

Also, the at least one memory may contain instructions executable by the at least one processor such that the cellular network entity is operable to trigger sending access information for accessing the UAV application server to the UAV. The access information for accessing the UAV application server may be included in an attach accept message destined for the UAV. More specifically, the access information for accessing the UAV application server may be included in a PCO field of the attach accept message. The access information for accessing the UAV application server may comprise a network address of the UAV application server. Also, an interface allowing access to the UAV may be provided to entities external to the cellular network.

Further, the at least one memory may contain instructions executable by the at least one processor such that the cellular network entity is operable to trigger selecting a gateway entity of the cellular network for communication between the UAV and the UAV application server. The gateway entity may be selected from a plurality of gateway entities in the cellular network such that a distance between the UAV and the gateway entity is minimized. Triggering selecting the UAV application server may comprise requesting the access information for accessing the UAV application server from the selected gateway entity of the cellular network.

According to a second aspect, a UAV connectable to a cellular network is provided. The UAV comprises at least one processor and at least one memory, wherein the at least one memory contains instructions executable by the at least one processor such that the UAV is operable to receive, as part of an attach procedure of the UAV to the cellular network, access information for accessing a UAV application server residing in the cellular network and assigned to the UAV by the cellular network.

The UAV and the UAV application server may correspond to the UAV and the UAV application server described above in relation to the computing unit according to the first aspect. As such, those aspects described with regard to the UAV and the UAV application server in relation to the first aspect which are applicable to the UAV and the UAV application server according to the second aspect may be comprised by the second aspect as well, and vice versa. Unnecessary repetitions are thus omitted.

The access information for accessing the UAV application server may comprise a network address of the UAV application server. Also, the at least one memory may further contain instructions executable by the at least one processor such that the UAV is operable to send an attach request message to the cellular network, wherein the attach request message includes information indicating that the UAV requests access information for accessing a UAV application server. The information indicating that the UAV requests access information for accessing a UAV application server may be included in a PCO field of the attach request message. Further, the access information for accessing the UAV application server may be included in an attach accept message destined for the UAV. More specifically, the access information for accessing the UAV application server may be included in a PCO field of the attach accept message.

According to a third aspect, a system comprising a cellular network entity of the first aspect and a UAV of the second aspect is provided.

According to a fourth aspect, a method for selecting a UAV application server residing in a cellular network to be assigned to a UAV connecting to the cellular network is provided. The method is performed by a cellular network entity and comprises triggering selecting, as part of an attach procedure of the UAV to the cellular network, a UAV application server in the cellular network to be assigned to the UAV.

According to a fifth aspect, a method for selecting a UAV application server residing in a cellular network to be assigned to a UAV connecting to the cellular network is provided. The method is performed by the UAV and comprises receiving, as part of an attach procedure of the UAV to the cellular network, access information for accessing a UAV application server residing in the cellular network and assigned to the UAV by the cellular network.

The apparatus features described herein with reference to the first and second aspects may also be embodied as functions, services or steps in the methods of the fourth and fifth aspects.

According to a sixth aspect, a computer program product is provided. The computer program product comprises program code portions for performing the method of at least one of the fourth and fifth aspect when the computer program product is executed on one or more computing devices. The computer program product may be stored on a computer readable recording medium, such as a semiconductor memory, DVD, CD-ROM, and so on. The computer program product may also be provided for download via a communication network (e.g., the Internet or a proprietary network).

BRIEF DESCRIPTION OF THE DRAWINGS

Implementations of the technique presented herein are described herein below with reference to the accompanying drawings, in which:

FIGS. 4a to 4c illustrate exemplary cellular network architectures (LTE and 5G) including a UAV and a cellular network entity according to the present disclosure and a corresponding attach procedure which may be performed in these architectures.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other implementations that depart from these specific details. For example, while the following implementations will be described with regard to LTE and 5G architectures, it will be understood that the present disclosure shall not be limited to these architectures and that the technique presented herein may be practiced with other cellular network architectures as well.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1A:
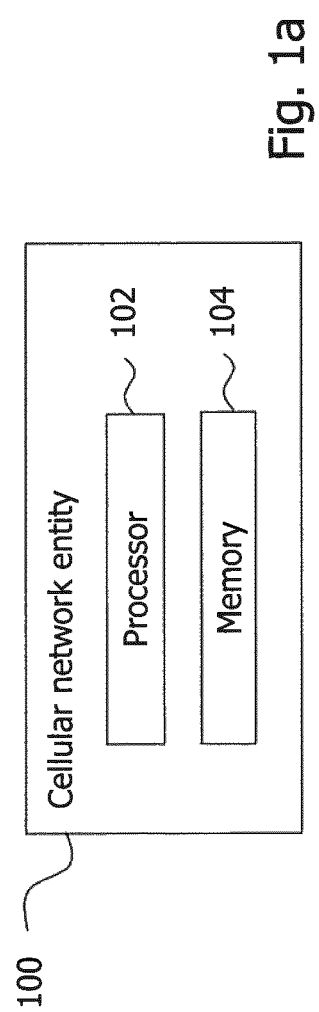
FIGS. 1a and 1b illustrate an exemplary composition of a computing unit configured to execute a cellular network entity according to the present disclosure and an exemplary composition of a UAV according to the present disclosure.

FIG. 1a schematically illustrates an exemplary composition of a computing unit which is configured to execute a cellular network entity 100 configured to select a UAV application server residing in a cellular network to be assigned to a UAV connecting to the cellular network. The computing unit comprises at least one processor 102 and at least one memory 104, wherein the at least one memory 104 contains instructions executable by the at least one processor 102 such that the cellular network entity 100 is operable to carry out the method steps described herein below. It will be understood that the computing unit for executing the cellular network entity 100 may be a physical computing unit as well as a virtualized computing unit, such as a virtual machine, for example. It will further be appreciated that the computing unit may not necessarily be implemented as a standalone computing unit, but may be implemented as components—realized in software and/or hardware—residing on multiple distributed computing units as well.

Figure 1B:
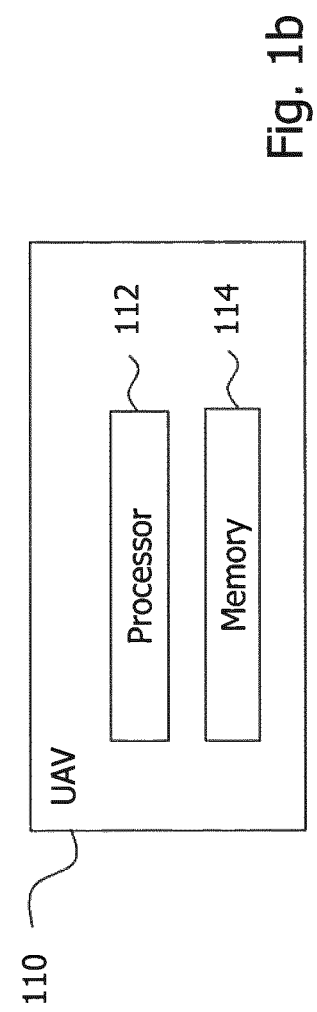

FIG. 1b schematically illustrates an exemplary composition of a UAV 110 which is connectable to the cellular network. The UAV 110 comprises at least one processor 112 and at least one memory 114, wherein the at least one memory 114 contains instructions executable by the at least one processor 114 such that the UAV 110 is operable to carry out the method steps described herein below.

Figure 2A:
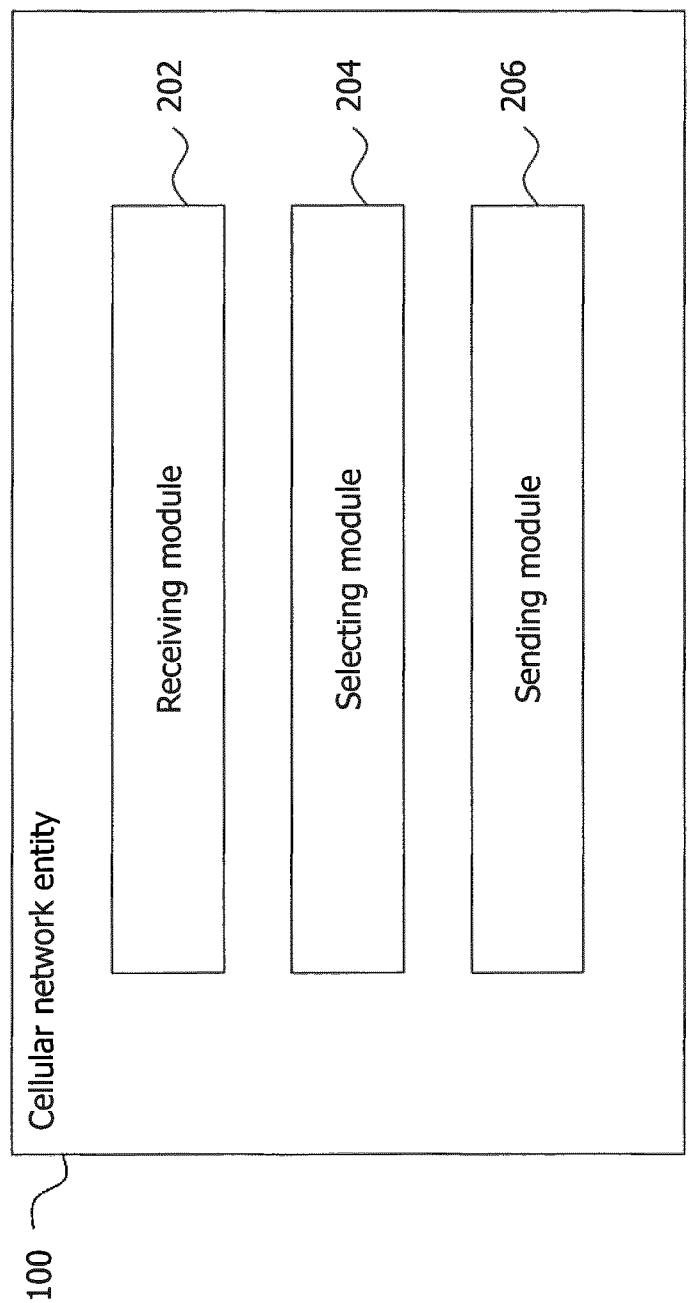
FIGS. 2a and 2b illustrate a modular composition of a computing unit configured to execute a cellular network entity according to the present disclosure and a corresponding method which may be performed by the cellular network entity.
Figure 2B:
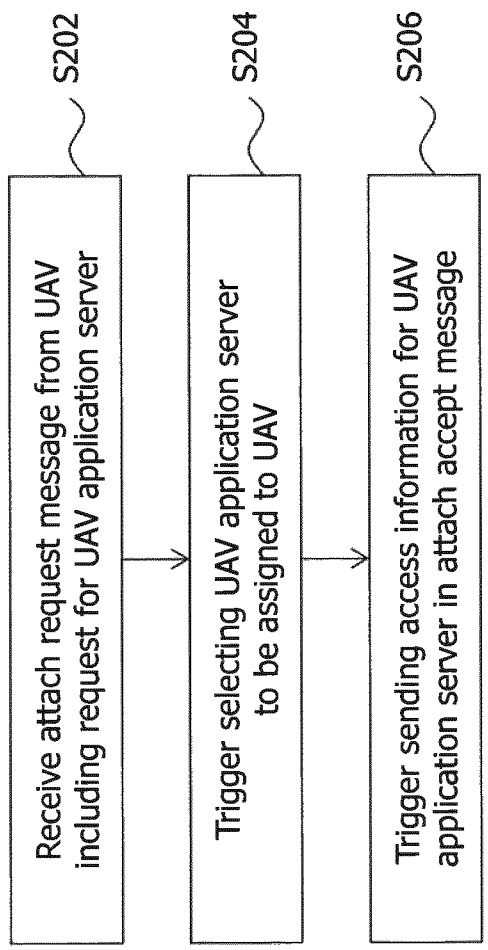

FIG. 2a schematically illustrates an exemplary modular composition of the computing unit which is configured to execute the cellular network entity 100 and FIG. 2b illustrates a corresponding method which may be performed by the cellular network entity 100. The basic operation of the cellular network entity 100 will be described in the following with reference to both FIGS. 2a and 2b.

Mainly, in step S204, a selecting module 204 of the cellular network entity 100 may trigger selecting, as part of an attach procedure of the UAV 110 to the cellular network, a UAV application server in the cellular network to be assigned to the UAV 110.

The cellular network to which the UAV 110 connects may be a mobile communication network, such as an LTE network or a 5G network, for example. The UAV application server may reside in the cellular network and may be under the administrative domain of the operator of the cellular network. The UAV application server may thus be said to be an entity of the cellular network or, in other words, to form part of the cellular network. The UAV application server may be an entity that manages (e.g., monitors and/or controls) one or more UAVs connected to the cellular network (including the UAV 110) during their operation, such as during their flight. For example, the UAV application server may receive positioning data from one or more UAVs connected to the cellular network, track the flight paths of the UAVs and control the UAVs as needed.

The UAV application server may be assigned to the UAV 110 when the UAV 110 connects to the cellular network. This may take place when the UAV 110 is powered on, for example. The cellular network may comprise one or more UAV application servers which are assignable to the UAV 110 and, therefore, the UAV application server to be assigned to the UAV 110 may be selected from the one or more UAV application servers. This selection may be triggered by the cellular network entity 100 and, more specifically, the selection may be performed as part of an attach procedure of the UAV 110 to the cellular network.

The attach procedure may correspond to a registration procedure for registering the UAV 110 in the cellular network when the UAV 110 attempts to connect to the cellular network. The attach procedure may follow a standard registration procedure required by the cellular network, such as a standard LTE or 5G registration procedure in case of LTE or 5G networks, for example. Since the selection of the UAV application server may be performed as part of the attach procedure to the cellular network, the selection of the UAV application server may not be carried out over-the-top (OTT) of the cellular network using a default Internet connection, but rather on the control plane level of the cellular network. In other words, it may be said that the attach procedure is employed (or exploited) for an automatic selection of the UAV application server when the UAV 110 connects to the cellular network.

The cellular network entity 100 may be an entity of the cellular network which is involved in the attach procedure of the UAV 110 to the cellular network. In particular, the cellular network entity 100 may be an entity which receives an attach request message originated from the UAV 110 or, in other words, which triggers selection of the UAV application server in response to receipt of the attach request message by the cellular network. In one variant, the cellular network entity 100 may be a mobility management entity of the cellular network. When the cellular network is an LTE network, the cellular network entity 100 may correspond to a Mobility Management Entity (MME) and, when the cellular network is a 5G network, the cellular network entity 100 may correspond to an Access and Mobility Function (AMF), for example.

In one implementation, the UAV application server may be selected from a plurality of UAV application servers in the cellular network. In this case, each of the plurality of UAV application servers may cover a specific service area of the cellular network and, consequently, the cellular network may comprise a plurality of corresponding UAV application server service areas. UAV application server service areas may also differ according to different cellular networks and different cellular network operators, for example. The UAV application server may have a full view of its service areas, including information about cellular coverage (which may also be available for specific heights) as well as additional relevant information associated with the UAV 110, such as knowledge of the flight path of the UAV, knowledge of UAV equipment entity data (e.g., an International Mobile Station Equipment Identity, IMEI) associated with the UAV 110 or knowledge of UAV identity data in the cellular network (e.g., a Mobile Subscriber Integrated Services Digital Network Number, MSISDN) associated with the UAV 110, for example.

The cellular network entity 100, such as the mobility management entity, for example, may also have knowledge of relevant information associated with the UAV 110, such as knowledge of which UAV application server and which gateway entity of the cellular network (e.g., a Packet Data Network Gateway, PDN GW, in case of an LTE network or a User Plane Function, UPF, in case of a 5G network) serve the UAV 110. Further, the cellular network entity 100 may store data which identifies the UAV 110 as a UAV type of device (e.g., differentiating the UAV 110 from a terrestrial User Equipment, UE) based on which the cellular network entity 100 may control bearers provided to the UAV 110 with different behaviors. For example, the UAV may 110 be connected to a plurality of gateway entities (e.g., PDN GWs or UPFs, respectively). In this case, one gateway entity may be used for control of the UAV 110 (and may be in a separate network slice), whereas another gateway entity may be used for a specific service relating to the UAV 110, such as a high throughput video service, for example.

When the UAV application server is selected from a plurality of UAV application servers in the cellular network, the UAV application server may be selected such that a distance between the UAV 110 and the UAV application server is minimized. This may involve selecting the UAV application server among the plurality of UAV application servers in the cellular network which is closest to a gateway entity (e.g., PDN GW or UPF, respectively) to which the UAV is being connected as part of the attach procedure. By minimizing the distance between the UAV and the UAV application server, a latency in communication between the UAV 110 and the UAV application server may be reduced.

The UAV application server may be selected based on UAV-related information comprising one or more parameters characterizing the UAV 110. The one or more parameters characterizing the UAV 110 may comprise at least one of a mobility tracking area associated with the UAV 110 (e.g., a mobility tracking area in which the UAV 110 is currently located), a cell ID associated with the UAV 110 (e.g., an ID of a cell in which the UAV 110 is currently located), a type of the UAV 110, an owner of the UAV 110, a manufacturer of the UAV 110, and an operator of the UAV 110. When the cellular network is an LTE network, for example, the mobility tracking area may correspond to a Tracking Area (TA) associated with the UAV 110 stored in the MME. A further parameter characterizing the UAV 110 may be an indication of whether use of the UAV 110 is commercial a private, for example.

In one variant of selecting the UAV application server, the UAV application server may be selected in a static manner. In this case, the UAV application server which is assigned to the UAV 110 may be configured statically in the cellular network entity 100 (e.g., the mobility management entity) or in another entity of the cellular network, such as a gateway entity (e.g., PDN GW or UPF, respectively), from which the cellular network entity 100 may request information about the UAV application server to be assigned to the UAV 110. In another variant of selecting the UAV application server, the UAV application server may be selected in a dynamic manner. In this case, the UAV application server which is assigned to the UAV 110 may be determined dynamically by the cellular network entity 100 or by the above-mentioned other entity of the cellular network. In one such variant, selecting the UAV application server may comprise determining the UAV application server by querying a DNS service (or another database) using an FQDN reflecting the one or more parameters characterizing the UAV 110. Two exemplary FQDNs are provided in the following in which the initial part of the respective FQDN encodes the manufacturer of the UAV 110 or the operator of the UAV 110, respectively:
1) Manufacturer_UAV_AS.epc.mnc<mnc-val>.mcc<mcc-val>0.3gppnetwork.org
2) Delivery_operator_UAV_AS.epc.mnc<mnc-val>.mcc<mcc-val>0.3gppnetwork.org Here, the portion "mcc<mcc-val>" may correspond to a Mobile Country Code (MCC) with a respective MCC value and "mnc<mnc-val>" may correspond to a Mobile Network Code (MNC) with a respective MNC value. The MCC may indicate the country to which the mobile subscriber (i.e., the UAV 110) belongs and the MNC may identify a particular cellular network in that country. The UAV manufacturer and the UAV operator reflected in the above exemplary FQDNs further characterize the UAV. The DNS service may then resolve these FQDNs and obtain corresponding UAV application server network addresses which may be provided to the UAV as access information for accessing the selected UAV application server, for example. It will be understood that, instead of the UAV manufacturer and the UAV operator in the above examples, other parameters characterizing the UAV, such as a mobility tracking area or a cell ID associated with the UAV 110 may be included in the FQDN, and the DNS service may return a network address of the UAV application server which is closest to that area accordingly.

Initially, e.g., when the UAV is powered on, the UAV 110 may neither have knowledge of a UAV application server nor knowledge of access information for accessing a UAV application server. However, the UAV 110 may request such information during the attach procedure of the UAV 110 to the cellular network. Thus, prior to triggering selecting a UAV application server to be assigned to the UAV 110 according to step S204, a receiving module 202 of the cellular network entity 100 may receive, in step S202, an attach request message originated from the UAV 110, wherein the attach request message includes information indicating that the UAV 110 requests access information for accessing a UAV application server. In one particular such implementation, the information indicating that the UAV 110 requests access information for accessing a UAV application server may be included in a PCO field of the attach request message. This may indicate to the cellular network entity 100 that a UAV application server is to be selected and corresponding access information is to be provided to the UAV 110.

Once the UAV application server to be assigned to the UAV 110 has been selected in step S204, a sending module 206 of the cellular network entity 100 may trigger sending access information for accessing the UAV application server to the UAV 110. The access information may be determined together with the selection of the UAV application server, e.g., by the above-described technique of querying a DNS service using an FQDN reflecting one or more parameters characterizing the UAV 110. In one implementation, the access information for accessing the UAV application server may be included in an attach accept message destined for the UAV and, in one particular such implementation, the access information for accessing the UAV application server may be included in a PCO field of the attach accept message. The access information may be present in the PCO field of the attach accept message only, when the information indicating that the UAV 110 requests access information for accessing the UAV application server was included in a PCO field of the previous attach request message originated from the UAV 110. The access information for accessing the UAV application server may comprise a network address of the UAV application server, such as an IP address, for example. Upon receiving the access information for accessing the UAV application server, the UAV 110 may use the access information to register at the UAV application server for the upcoming operation.

As mentioned above, the UAV application server may be selected among the plurality of UAV application servers in the cellular network as the one which is closest to a gateway entity (e.g., PDN GW or UPF, respectively) to which the UAV is being connected during the attach procedure. A similar approach may be applied for selecting the gateway entity itself. The cellular network entity 100 may thus further be operable to trigger selecting a gateway entity of the cellular network for communication between the UAV 110 and the UAV application server. Similar to the UAV application server, the gateway entity may be selected from a plurality of gateway entities in the cellular network such that a distance between the UAV 110 and the gateway entity is minimized. By minimizing the distance between the UAV 110 and the gateway entity, a latency in communication between the UAV 110 and the gateway entity may be reduced. In one variant, triggering selecting the UAV application server may comprise requesting the access information for accessing the UAV application server from the selected gateway entity of the cellular network. This may be the case when the cellular network entity 100 is the mobility management entity which requests the access information for accessing these UAV application server from the gateway entity that is being connected to the UAV 110 as part of the attach procedure, for example.

In the attach procedure, it may further be possible to make the UAV 110 reachable by entities external to the cellular network. For this purpose, an interface allowing access to the UAV 110 may be provided to entities external to the cellular network. For example, the UAV 110 may be assigned network identification information, such as a network address (e.g., IP address), with the attach accept message to render the UAV 110 reachable by entities external to the cellular network, such as entities accessing the UAV 110 from the Internet. An external entity may be a control entity that is configured to control the UAV, such as a service running on a dedicated server or cloud, or a control device like a UE or another handheld device, configured to steer the UAV, for example. The determined access information for accessing the UAV application server may also be provided to such external entity which, in turn, may register itself at the UAV application server to gain access to functions of the UAV application server, such as the above-mentioned management and/or control functions regarding the UAV 110.

Figure 3A:
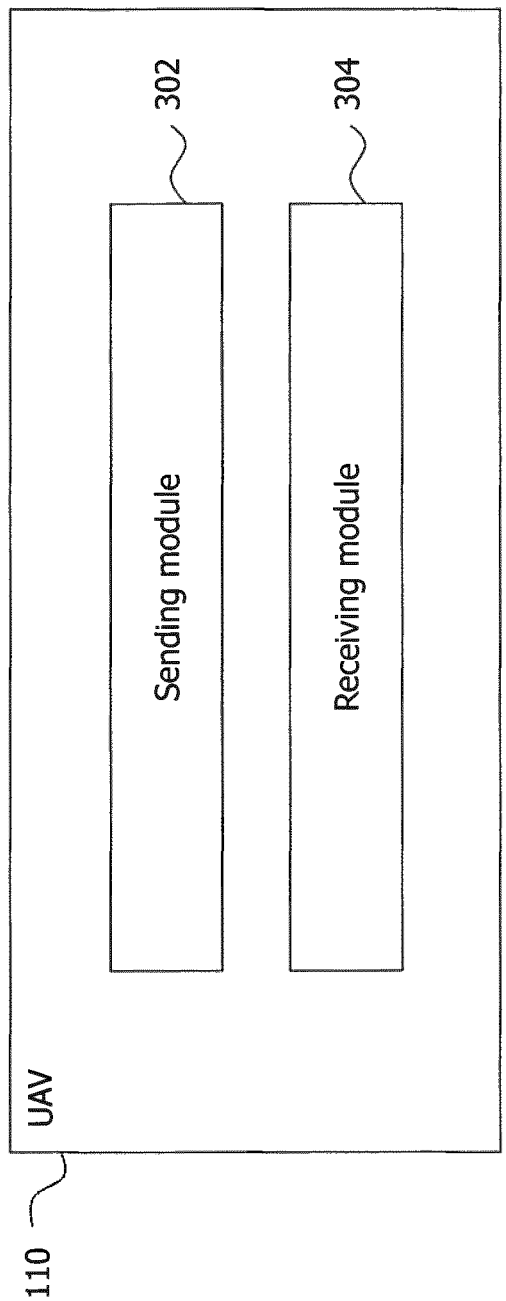
FIGS. 3a and 3b illustrate a modular composition of a UAV according to the present disclosure and a corresponding method which may be performed by the UAV.
Figure 3B:
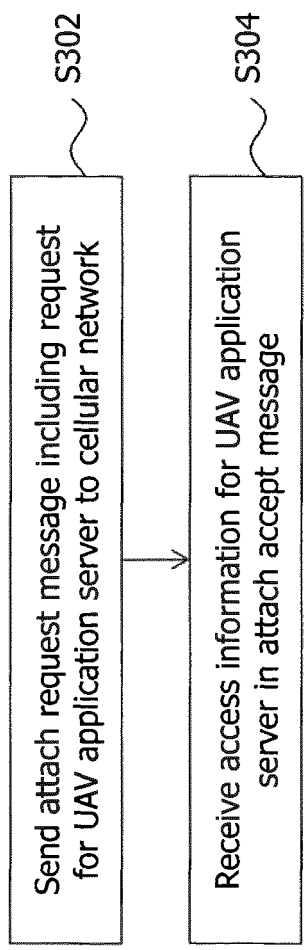

FIG. 3*a* schematically illustrates an exemplary modular composition of the UAV 110 and FIG. 3*b* illustrates a corresponding method which may be performed by the UAV 110. The basic operation of the UAV 110 will be described in the following with reference to both FIGS. 3*a* and 3*b*. This operation may be complementary to the operation of the cellular network entity 100 described above in relation to FIGS. 2*a* and 2*b* and, as such, aspects described above with regard to the UAV 110 may be applicable to the UAV 110 described in the following as well. Unnecessary repetitions are thus omitted.

Mainly, in step S304, a receiving module 304 of the UAV 110 may receive, as part of the attach procedure of the UAV 110 to the cellular network, access information for accessing a UAV application server residing in the cellular network and assigned to the UAV 110 by the cellular network. The access information for accessing the UAV application server may comprise a network address of the UAV application server, such as an IP address of the UAV application server, for example.

As mentioned above in relation to FIGS. 2*a* and 2*b*, initially, e.g., when the UAV 110 is powered on, the UAV 110 may neither have knowledge of a UAV application server nor knowledge of corresponding access information. To obtain access information for accessing a UAV application server, a sending module 302 of the UAV 110 may send prior to step S304, in step S302, an attach request message to the cellular network, wherein the attach request message includes information indicating that the UAV 110 requests access information for accessing a UAV application server. In one particular implementation, the information indicating that the UAV 110 requests access information for accessing a UAV application server may be included in a PCO field of the attach request message.

Similarly, when the access information for accessing the UAV application server is received from the cellular network, the access information for accessing the UAV application server may be included in an attach accept message destined for the UAV. The attach accept message may be originated by the cellular network entity 100, for example. The access information for accessing the UAV application server may be included in a PCO field of the attach accept message, wherein the access information may be present in the PCO field of the attach accept message only, when the information indicating that the UAV 110 requests access information for accessing the UAV application server was included in a PCO field of the attach request message sent to the cellular network.

Figure 4A:
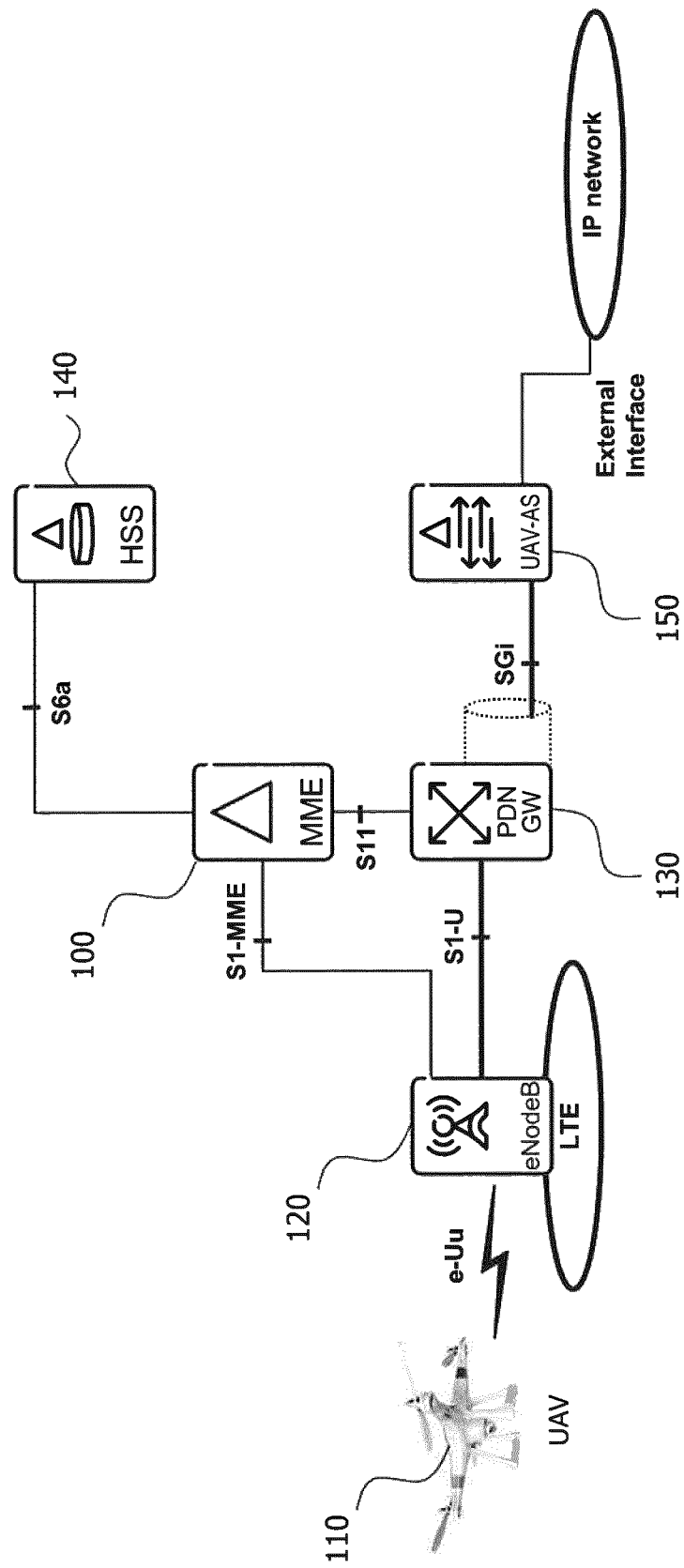

FIG. 4*a* schematically illustrates a simplified LTE architecture in which the technique for selecting a UAV application server to be assigned to the UAV 110 disclosed herein may be practiced. As common LTE architectures, the architecture shown in FIG. 4*a* comprises an eNodeB 120 through which the UAV 110 may connect to the cellular network using an e-Uu interface. The eNodeB 120 connects to an MME (corresponding to the cellular network entity 100 in the illustrated example) for control plane support using an S1-MME interface and to a PDN GW 130 for user plane support (i.e., for user data transfer) using an S1-U interface. The MME 100, in turn, is connected to a Home Subscriber Service (HSS) 140 containing user-related and subscription-related information via an S6a interface. It will be understood by the skilled person that the architecture shown in FIG. 4*a* corresponds to a simplified LTE architecture in which only those components that are necessary for the purpose of elucidating the technique presented herein are shown.

In addition to the above-described common entities of an LTE network, the architecture illustrated in FIG. 4*a* further comprises a UAV application server 150 (denoted as "UAV-AS" in the figure) as part of the cellular network. The UAV application server 150 may correspond to the UAV application server described in relation to FIGS. 2*a*, 2*b*, 3*a* and 3*b*. The UAV application server 150 connects to the PDN GW 130 through an SGi interface and supports an external interface which allows access to functions of the UAV application server 150 to entities external to the cellular network, such as entities accessing the UAV application server 150 from the Internet, for example. These functions may include the UAV management and/or control functions mentioned above.

FIG. 4*b* illustrates an exemplary attach procedure for connecting the UAV 110 to the cellular network. The attach procedure is depicted as a sequence diagram which shows the corresponding interactions between the entities shown in FIG. 4*a*. The attach procedure may correspond to a standard LTE registration procedure performed when the UAV 110 connects to the cellular network, e.g. when the UAV 110 is turned on. It will be understood by the skilled person that the following exemplary description of the attach procedure corresponds to a simplified procedure that does not reflect standard LTE attach procedures in every detail. The skilled person will rather appreciate that the following exemplary description rather focuses on those interactions between the entities shown in FIG. 4*a* which are necessary for the purpose of elucidating the technique presented herein.

The attach procedure begins at step S402, at which the UAV 110 signals setup of a Radio Resource Control (RRC) connection by sending an RRC Connection Request to the eNodeB 120. This request is also used to initiate the attach procedure by sending an Attach Request message as Non-Access Stratum (NAS) payload of the RRC Connection Request. The Attach Request message may contain a PCO field which includes information indicating that the UAV 110 requests access information for accessing a UAV application server. The UAV 110 may be configured to include such information as an additional protocol configuration option to the Attach Request message. PCOs may generally be used to transfer parameters between the mobile subscriber (in this case the UAV 110) and entities in the cellular network during the attach procedure. A new PCO having a value, such as "UAV-AS IP-Address", may be used for this purpose, for example.

At step S404, the eNodeB 120 forwards the Attach Request message to the MME 100, wherein the Attach Request message is embedded in an Initial UE message sent over the S1-MME interface to the MME 100. The Attach Request message may be sent together with a PDN connectivity request, a Tracking Area Identifier (TAI) and an E-UTRAN Cell Global Identifier (ECGI) of the cell from which the message was received. At step S406, the MME 100 sends an Authentication Information Request to the HSS 140 to pull identification data like an International Mobile Subscriber Identity (IMSI) via the S6a interface. This data may be received by the MME 100 in step S408 in a corresponding Authentication Information Answer which may include additional information, such as EPS Authentication Vectors, an EPS subscribed QoS Profile and a subscribed Access Point Name-Aggregate Maximum Bit Rate (APN-AMBR), for example. At step S410, the MME 100 initiates default bearer establishment by requesting the PDN GW 130 to create a GPRS Tunneling Protocol (GTP) tunnel and the PDN GW 130 may respond accordingly at step S412. The APN or a UE Usage Type specified by the UAV 110 may be used for default bearer activation and an IP address assigned to the UAV 110 as well as downlink and uplink maximum data rates allowed at the APN level may be provided with the response of the PDN GW 130.

At step S414, the MME 100 triggers selecting the UAV application server 150 to be assigned to the UAV 110. This selection may be performed statically or dynamically, using the techniques for selecting the UAV application server 150 described above in relation to FIGS. 2a and 2b. For example, the MME 100 may request the UAV application server 150 to be assigned to the UAV 110 from the PDN GW 130. When static selection is used, the IP address of the UAV application server 150 may be configured statically in the PDN GW 130 and may be provided by the PDN GW 130 to the MME 100 accordingly. In case of dynamic selection, the IP address of the UAV application server 150 may be determined dynamically, e.g., using the technique of querying a DNS service using an FQDN reflecting one or more parameters characterizing the UAV 110, as described above in relation to FIGS. 2a and 2b. It will be understood that, when the MME 100 requests the PDN GW 130 for the UAV application server 150, step S414 could also be performed as part of step S412.

At step S416, the MME 100 responds to the eNodeB 120 with an Initial Context Setup Request message which contains an Attach Accept message. The Attach Accept message may include a PCO field indicating the IP address of the selected UAV application server 150, representing access information for accessing the UAV application server 150 to be provided to the UAV 110. In response, the eNodeB 120 responds with an Initial Context Setup Response message in step S418 and, in step S420, NAS Transport messages are used to provide the Attach Accept message to the UAV 110.

After that, at step S422, the UAV 110 sends a Direct Transfer message including an Attach Complete message to the eNodeB 120 (e.g., comprising an EPS Bearer Identity, a NAS sequence number and a NAS-MAC) which forwards the Attach Complete message to the MME 100. The MME 100 may respond in step S424 and, in step S426, a default bearer between the UAV 110 and the PDN GW 130 may be established. Finally, at step S428, IP connectivity may be established between the PDN GW 130 and the UAV application server 150 via the APN. At this point, the attach procedure may be complete and connectivity between the UAV 110 and the UAV application server 150 may be established. As a next step, the UAV 110 may use the IP address of the UAV application server 150 received as part of the attach procedure to register at the UAV application server 150 for the upcoming operation of the UAV 110.

Figure 4C:
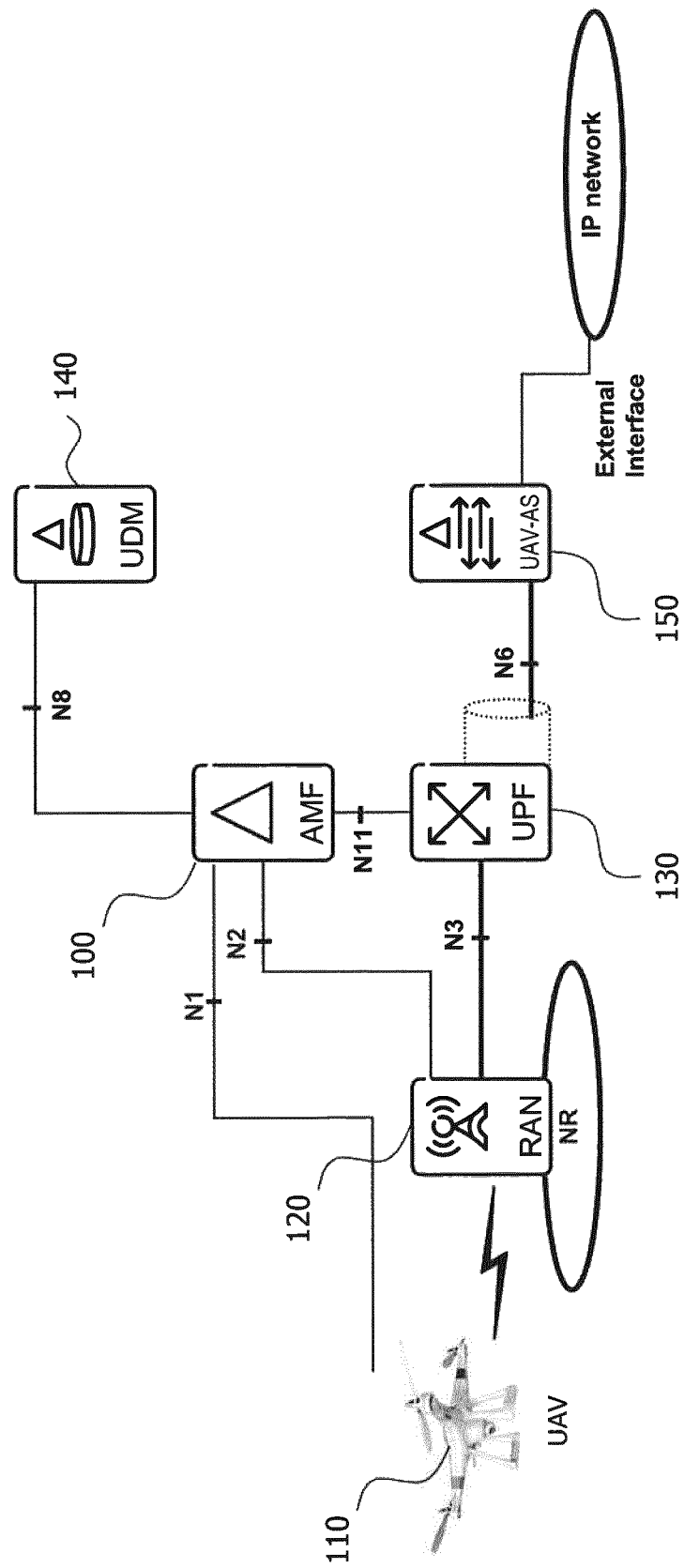

Similar to FIG. 4a, FIG. 4c schematically illustrates a simplified 5G architecture in which the technique for selecting a UAV application server 150 to be assigned to the UAV 110 disclosed herein may be practiced. The architecture shown in FIG. 4c corresponds to a 5G variant of the architecture described in relation to FIG. 4a. The basic principles for practicing the technique presented herein may equally apply to the 5G architecture of FIG. 4c. Unnecessary repetitions are thus omitted in the following. Only, it is noted that the functions described above for the eNodeB, the MME, the PDN GW and the HSS may in this case be performed by corresponding functions of the 5G architecture, i.e., the Radio Access Network (RAN), the AMF, the User Plane Function (UPF) and the User Data Management (UDM), respectively.

As has become apparent from the above, the present disclosure provides a technique for selecting a UAV application server to be assigned to a UAV connecting to a cellular network. The technique presented herein may enable a UAV to automatically discover a UAV application server when the UAV is taken into service and, consequently, access information for accessing the UAV application server may be conveyed by the cellular network to the UAV at initial network registration. In particular, the presented technique may enable exploiting cellular network capabilities and the benefits arising therefrom for the operation of a UAV, including reusing the standard attach procedures of the cellular network for automatic selection of the UAV application server.

By using centralized UAV application servers, the technique presented herein may allow operators to implement and comply with regulatory requirements, such as requirements enforced by central flight regulation authorities, for example. More specifically, if regulators require UAV flight regulation, there may be a dedicated UAV application server that is to be used by any UAV using the cellular network when the UAV is turned on. This requirement may be satisfied by the presented technique. Further, since the cellular network may represent a trusted network, the functions provided by the UAV application server may be known to and used by central flight regulation authorities to control UAV usage (including both commercially and privately operated UAVs), to enforce policies, such as not entering a restricted flight space or keeping a speed limit, for example.

Moreover, when a UAV application server needs to be selected among a plurality of UAV application servers, it will be understood that the geolocation of these servers may be different and unpredictable distances between the UAV and the selected UAV application server may be the consequence, potentially causing high communication latency that may lead to degradation of UAV control quality. By the technique presented herein, the cellular network may control the UAV application server selection as well as the selection of corresponding gateway entities (e.g., PDN GWs or UPFs, respectively) to minimize these distances, reduce communication latencies and improve control quality for the UAVs.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A computing unit for executing a cellular network entity configured to select an Unmanned Aerial Vehicle (UAV) application server residing in a cellular network to be assigned to a UAV connecting to the cellular network, the computing unit comprising:
   processing circuitry;
   memory containing instructions executable by the processing circuitry whereby the cellular network entity is operative to:
   trigger selecting, as part of an attach procedure of the UAV to the cellular network, a UAV application server in the cellular network to be assigned to the UAV.

2. The computing unit of claim 1, wherein the UAV application server is selected from a plurality of UAV application servers in the cellular network, each of the plurality of UAV application servers covering a specific service area of the cellular network.

3. The computing unit of claim 1, wherein the UAV application server is selected from a plurality of UAV application servers in the cellular network such that a distance between the UAV and the UAV application server is minimized.

4. The computing unit of claim 1, wherein the UAV application server is selected based on UAV-related information comprising one or more parameters characterizing the UAV.

5. The computing unit of claim 4, wherein the one or more parameters characterizing the UAV comprise: a mobility tracking area associated with the UAV, a cell ID associated with the UAV, a type of the UAV, an owner of the UAV, a manufacturer of the UAV, and/or an operator of the UAV.

6. The computing unit of claim 4, wherein the selecting the UAV application server comprises determining the UAV application server by querying a Domain Name Service (DNS) using a Fully Qualified Domain Name (FQDN) reflecting the one or more parameters characterizing the UAV.

7. The computing unit of claim 1, wherein the instructions are such that the cellular network entity is operable to receive an attach request message originated from the UAV, wherein the attach request message includes information indicating that the UAV requests access information for accessing a UAV application server.

8. The computing unit of claim 1, wherein the instructions are such that the cellular network entity is operable to trigger sending access information for accessing the UAV application server to the UAV.

9. The computing unit of claim 7, wherein the access information for accessing the UAV application server comprises a network address of the UAV application server.

10. The computing unit of claim 1, wherein an interface allowing access to the UAV is provided to entities external to the cellular network.

11. The computing unit of claim 1, wherein the instructions are such that the cellular network entity is operable to trigger selecting a gateway entity of the cellular network for communication between the UAV and the UAV application server.

12. The computing unit of claim 11, wherein the gateway entity is selected from a plurality of gateway entities in the cellular network such that a distance between the UAV and the gateway entity is minimized.

13. The computing unit of claim 11, wherein the triggering selecting the UAV application server comprises requesting the access information for accessing the UAV application server from the selected gateway entity of the cellular network.

14. An Unmanned Aerial Vehicle (UAV) connectable to a cellular network, the UAV comprising:
processing circuitry;
memory containing instructions executable by the processing circuitry whereby the UAV is operative to:
receive, as part of an attach procedure of the UAV to the cellular network, access information for accessing a UAV application server residing in the cellular network and assigned to the UAV by the cellular network.

15. The UAV of claim 14, wherein the access information for accessing the UAV application server comprises a network address of the UAV application server.

16. The UAV of claim 14, wherein the instructions are such that the UAV is operable to send an attach request message to the cellular network, wherein the attach request message includes information indicating that the UAV requests access information for accessing a UAV application server.

17. The UAV of claim 16, wherein the information indicating that the UAV requests access information for accessing a UAV application server is included in a Protocol Configuration Options (PCO) field of the attach request message.

18. The UAV of claim 14, wherein the access information for accessing the UAV application server is included in an attach accept message destined for the UAV.

19. A method for selecting an Unmanned Aerial Vehicle (UAV) application server residing in a cellular network to be assigned to a UAV connecting to the cellular network, the method comprising a cellular network entity:
triggering selecting, as part of an attach procedure of the UAV to the cellular network, a UAV application server in the cellular network to be assigned to the UAV.

20. A method for selecting an Unmanned Aerial Vehicle (UAV) application server residing in a cellular network to be assigned to a UAV connecting to the cellular network, the method comprising the UAV:
receiving, as part of an attach procedure of the UAV to the cellular network, access information for accessing a UAV application server residing in the cellular network and assigned to the UAV by the cellular network.

* * * * *